(12) United States Patent
Michaud et al.

(10) Patent No.: US 7,139,970 B2
(45) Date of Patent: Nov. 21, 2006

(54) ASSIGNING A HOT SPOT IN AN ELECTRONIC ARTWORK

(75) Inventors: Jeffrey H. Michaud, Minneapolis, MN (US); Douglas K. Olson, Shoreview, MN (US)

(73) Assignee: Adobe Systems Incorporated, San Jose, CA (US)

( * ) Notice: Subject to any disclaimer, the term of this patent is extended or adjusted under 35 U.S.C. 154(b) by 556 days.

(21) Appl. No.: 09/058,496

(22) Filed: Apr. 10, 1998

(65) Prior Publication Data

US 2002/0052891 A1    May 2, 2002

(51) Int. Cl.
G06F 15/00    (2006.01)
G06F 17/00    (2006.01)

(52) U.S. Cl. .................. 715/501.1; 715/513; 345/629; 345/630; 345/631; 345/632; 345/633; 345/634; 345/635; 345/636

(58) Field of Classification Search ............. 707/501.1, 707/502, 503, 504, 505, 506, 507, 508, 509, 707/510, 511, 512, 513; 345/333, 332, 331, 345/330, 419, 357, 629–636, 342; 382/180; 709/203; 715/501.1, 513
See application file for complete search history.

(56) References Cited

U.S. PATENT DOCUMENTS

| 4,847,604 | A | | 7/1989 | Doyle ........................ 345/180 |
|---|---|---|---|---|
| 5,404,316 | A | | 4/1995 | Klingler et al. ............. 345/328 |
| 5,581,670 | A | * | 12/1996 | Bier et al. ................... 345/326 |
| 5,657,462 | A | | 8/1997 | Brouwer et al. ............ 345/336 |
| 5,684,715 | A | | 11/1997 | Palmer ....................... 348/473 |
| 5,692,212 | A | | 11/1997 | Roach ........................ 345/302 |
| 5,708,845 | A | * | 1/1998 | Wistendahl et al. ........ 345/302 |
| 5,727,141 | A | | 3/1998 | Hoddie et al. .............. 345/475 |
| 5,737,553 | A | | 4/1998 | Bartok ........................ 345/339 |
| 5,751,281 | A | | 5/1998 | Hoddie et al. .............. 345/302 |
| 5,751,852 | A | * | 5/1998 | Marimont et al. .......... 382/180 |
| 5,774,666 | A | | 6/1998 | Portuesi ...................... 725/110 |
| 5,818,455 | A | * | 10/1998 | Stone et al. ................. 345/433 |
| 5,844,557 | A | | 12/1998 | Shively, II .................. 345/339 |
| 5,852,810 | A | * | 12/1998 | Sotiroff et al. ................ 705/27 |
| 5,918,012 | A | | 6/1999 | Astiz et al. ................. 709/217 |
| 5,956,701 | A | * | 9/1999 | Habermehl .................. 706/20 |
| 5,977,978 | A | * | 11/1999 | Carey et al. ................. 345/419 |
| 5,983,244 | A | * | 11/1999 | Nation ........................ 707/501 |
| 5,991,781 | A | * | 11/1999 | Nielsen ....................... 707/513 |
| 6,034,689 | A | * | 3/2000 | White et al. ................. 345/357 |

(Continued)

FOREIGN PATENT DOCUMENTS

DE    42 25 872 A    5/1995

OTHER PUBLICATIONS

Mapedit Imagemap Editing Software, Version 2.3 for Windows 3.1, Boutell.Com, Inc. (screenshots pp. 1-16), 1997.*

(Continued)

Primary Examiner—William Bashore
(74) Attorney, Agent, or Firm—Fish & Richardson P.C.

(57) ABSTRACT

Apparatus and methods implementing a technique for creating an electronic artwork with a hot area. For a selected layer of the artwork, a non-transparent region is identified and an action is assigned to an area corresponding to the non-transparent region, the action defining a function that will be activated when the area is selected. The technique is advantageous in computer application programs that composite images from layers and for producing HTML (HyperText Markup Language) output that refers to a corresponding composited image, where the action is a URL and the area is defined by an image map.

35 Claims, 2 Drawing Sheets

U.S. PATENT DOCUMENTS 6,075,537 A * 6/2000 Adapathya et al. ......... 345/357
6,192,393 B1 * 2/2001 Tarantino et al. ........... 709/203
6,374,272 B1 * 4/2002 Bates et al. ................. 707/513

OTHER PUBLICATIONS

CompuWorks Labels Version 4.0.000, John P. Osborn—CompuWorks, Inc. (screenshots pp. 1-5), 1995.*

Mapedit Imagemap Editing Software, Version 2.3 for Windows 3.1, Boutell.Com, Inc. [screenshots] URL: http://www.boutell.com/mapedit, pp. 1-19, 1997.*

NCSA Imagemap Tutorial, web page downloaded from Internet: [<URL: http://hoohoo.ncsa.uiuc.edu/docs/tutorials/imagemapping.html>], pp. 1-4, Nov. 1995.*

Microsoft Press Computer Dictionary, Third Edition, 1997 Microsoft Corporation, p. 245.*

Mapedit Imagemap Editing Software, Version 2.3 for Windows 3.1, 1997 Boutell.Com, Inc. [screenshots] URL: http://www.boutell.com/mapedit, pp. 1-23.*

"Macromedia Fireworks Using Fireworks," Macromedia, Inc. May 1998, 3 pgs.

"Adobe PageMill³ 2.0 User Guide for Macintosh and Windows," Adobe Systems, Inc., 1997, 13 pgs.

"Adobe Illustrator 7.0 User Guide," Adobe Systems, Inc., 1997, 14 pgs.

U.S. Appl. No. 07/790,327, filed Nov. 12, 1991.

Ang et al., *Polymap: A Versatile Client-Side Image for the Web*, http://www.Iri.ucsf.edu/polymap/paper/polymap.html, Oct. 7, 1996.

Doyle et al., *Embedding Interactive External Program Objects Within Open-Distributed Hypermedia Documents*, http://www.eolas.com/papers/Papers/SPIE-95/, 1995.

*International Conference on Computer Graphics and Interactive Techniques*, pp. 28-38, 1995.

*MetaMAP®(originally published 1994)*, http://www.eolas.com/metamap/metamap.htm.

Ragget, *HTML 3.2 Reference Specification*, (W3C Working Draft Sep. 9, 1996, This version: http://www/w3.org/pub/WWW/TR/WD-html32-960909), http://www.w3.org/pub/WWW/TR/WD-html32.html.

Seidman, *An HTML Extension to Support client-Side Image Maps*, http://www.ncsa.uiuc.edu/SDG/IT . . . dings/DDay/seidman/seidman.html, Oct. 8, 1996.

*The Originators of Web Plug-In and Applet Technology*, http://www.eolas.com/papers.htm, Oct. 8, 1996.

Wong et al., *Interactive Query and Visualization of Medical Images on World Wide*, http://www.Iri.ucsf.edu/polymap/paper/spie96.html, Oct. 8, 1996.

\* cited by examiner

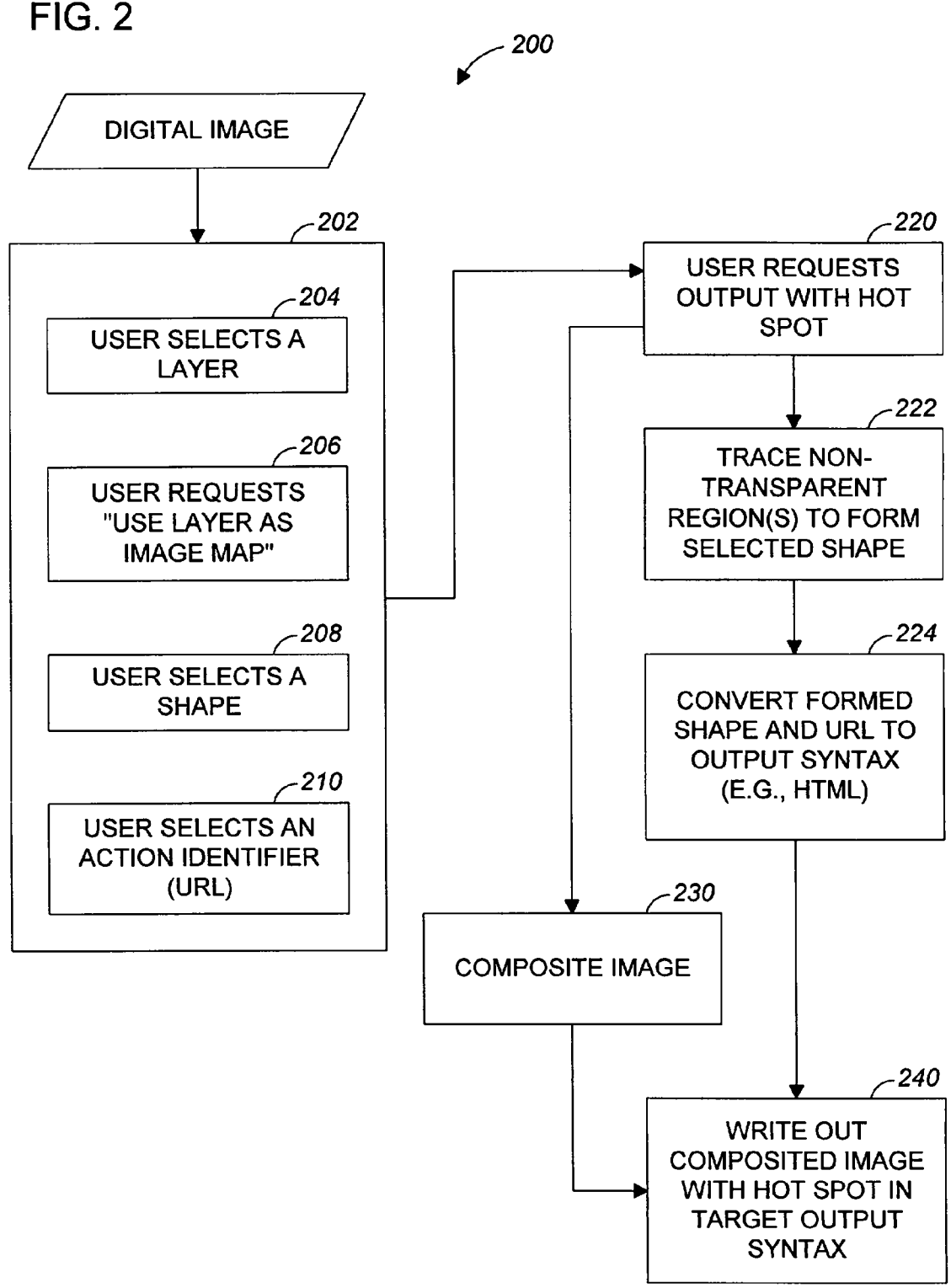

ASSIGNING A HOT SPOT IN AN ELECTRONIC ARTWORK

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to generating artwork or digital images with hot areas for computer program graphical user interfaces.

Computer program interfaces have long provided user-selectable graphics, such as buttons, as elements through which a user may interact with a computer program, to select an option or request a service from the program, for example. In network-based or distributed computer program applications, the selection of an interface element in a client program on one computer may be directed to either that program or to another program, such as a server program running on a separate computer. In Internet and intranet applications, the server program typically resides on a server computer remote from the client computer and communicating with it through a network connection.

One widely distributed and used class of client program is the HTML browser, such as the Netscape Navigator™ browser, available from Netscape Communications Corporation of Mountain View, Calif. Browsers typically provide support for a number of industry standard protocols, such as HTTP (HyperText Transport Protocol), and industry standard formats, such as HTML (HyperText Markup Language).

An HTML document may include links to other resources. Graphically, the simplest form of link is the URL (Universal Resource Locator) of the resource displayed in the familiar form of underlined text. Access to a resource may also be provided through an image that a user may select to request the resource. The HTML specification includes, among other elements, a MAP element and an IMG element with an ISMAP attribute for this purpose. The ISMAP element can be used to define a server-side image map. When the user clicks on the image, the ISMAP attribute of the element causes the image (x,y) coordinates of location clicked to be passed to the server in a derived URL. A MAP element may be used with an IMG element to provide a client-side image map. AREA elements define simple closed regions, such as polygons and circles, by their coordinates within the image. AREA elements in a MAP element can define hot spots or areas on the image and link the hot spots to URLs. A hot spot is an area of an image, which may correspond to graphic object or a section of text, that activates a function when selected.

SUMMARY OF THE INVENTION

In general, in one aspect, the invention features apparatus and methods implementing a technique for creating an electronic artwork with a hot area. For a selected layer of the artwork, a non-transparent region is identified and an action is assigned to an area corresponding to the non-transparent region, the action defining a function that will be activated when the area is selected. The technique is advantageous in computer application programs that composite images from layers.

Advantageous implementations of the technique include one or more of the following features. The action is a URL (Uniform Resource Locator). The layers of the artwork are composited and the area and the action are converted to a target output format. The target output format is HTML (HyperText Markup Language). A boundary of the non-transparent region is calculated and a definition of the area is calculated from the boundary. The composited artwork is written out as an image file and an HTML file is written out; the HTML file contains an image map for the area and a URL for the action, and refers to the image file.

Among the advantages of the invention are one or more of the following. An image object associated with a hot spot can be edited, and the hot spot will be conformed automatically to the edited object. The content of a layer defining a hot spot can be dynamic, that is, computed from other data at the time the layers are composited, and the hot spot will be conformed automatically to the dynamic content. Multiple hot spots can easily be created in a composite artwork. The method of assigning hot spots can be added easily to any graphics application that supports layers. The regions in the artwork layer by which a hot spot is defined do not have to be visible in the final composited image. For example, a visibility attribute of a hot spot layer can be set to invisible, and the hot spot will still be generated.

Other features and advantages of the invention will become apparent from the following description and from the claims.

BRIEF DESCRIPTION OF THE DRAWINGS

FIG. 2 is a flow chart of a method for creating a hot spot in an electronic artwork in accordance with the present invention.

DETAILED DESCRIPTION

Figure 1:
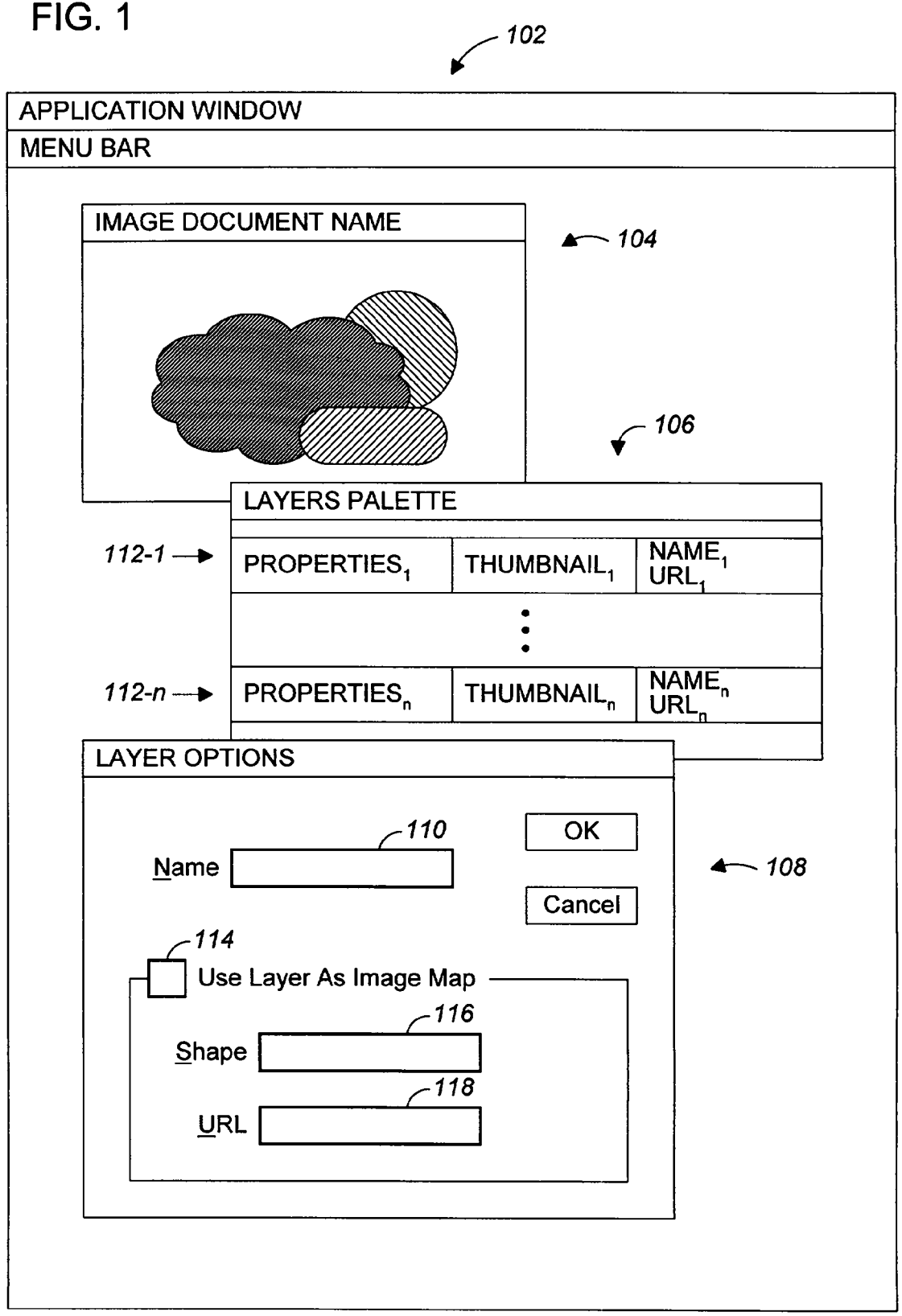
FIG. 1 is a schematic diagram of user interface elements in accordance with the present invention.

A wide variety of systems exist by which a user, such as an artist, can generate an electronic artwork. Graphics applications—that is, computer programs designed to enable a user to manipulate data or images, or to create images from data or from a library of shapes—enable the user to produce an electronic artwork (a picture) interactively. Two such applications are Adobe® Illustrator and Adobe® Photoshop, available from Adobe Systems Incorporated of San Jose, Calif. In general, a picture can include text, images, and shapes.

Many graphics applications build a final image by compositing several image layers together. The image layers may be thought of as stacked sheets of acetate, with transparent and non-transparent areas. In computer programs, the color and density of the ink on the acetate sheet are generally represented by a color value and an opacity (or "alpha") value, respectively.

Each layer typically includes image data, an optional mask, and compositing controls. Typically, the image data is represented by an array of pixels, with each pixel having a color and, optionally, an opacity. Typically, too, the mask is represented by an array of pixels, with each pixel having an opacity. Alternatively, the image data or the mask or both can be defined analytically, e.g., by using shape outlines, or by other functions that map positions to color and opacity.

In addition, the image data and the mask can be dynamic, i.e., computed from other data at the time the layers are composited.

FIG. 1 shows in schematic form a conventional application window 102 displayed on a computer display device by the graphical user interface of a graphics application. Within the window 102 are displayed a window 104 showing a picture, and a layers palette window 106 and a layer options dialog box 108 providing information and controls in accordance with invention, by which a user can cause a hot spot to be assigned to an area of the picture.

As shown in FIG. 2, a method 200 of assigning a hot spot to an area in an electronic artwork operates in the context of a digital image (that is, a picture) of a kind that has or can have layers. Through a user interface, the user performs a group of steps (steps 202) to select a layer (which may involve creating a layer) (step 204), to assign a hot spot to the selected layer (step 206), to select a shape for the hot spot (step 208), and to select an action identifier, such as a URL, for the hot spot (step 210).

The foregoing steps can be performed by the user through the layer options dialog box 108 (FIG. 1), as follows. The user enters a name in name box 110. This name will be one of the names $NAME_1$ through $NAME_n$ of the layers of the picture, which names are shown in the layers palette rows 112-1 through 112-n. The name box 110, like the shape box 116 and the URL input box 118, can be implemented to provide pull-down menus showing permissible or most recently used values.

By checking check box 114, the user indicates that the selected layer is to be used to define the area of a hot spot. In the illustrated implementation, this is done by creating an image map. The shape of the hot spot is indicated by the user in shape box 116 and the action to be associated with the hot spot is indicated in URL box 118. In the illustrated implementation, the permitted shapes are those supported by a target HTML format, namely rectangle, circle, and polygon, and the actions supported are URLs (Uniform Resource Locators). When a hot spot has been assigned to a layer, the assigned URL is displayed with the layer name, as indicated in rows 112-1 and 112-n. If no hot spot has been assigned, no URL would appear. The application associates the hot spot information—the shape and the URL—with the layer as a property of the layer.

At some time, the user will instruct the application to produce a form of output that includes hot spots (step 220, FIG. 2). In the illustrated implementation, in which the hot spot is an area of the picture and the target file format is HTML, this can occur when the user requests the application to show a preview of the artwork in a browser or when the user requests the application to export the artwork as an image file referred to by a generated HTML file.

In response to the request, the application composites the layers of the picture, as it would have done in the absence of hot spots, and the application prepares the hot spot information for output or display, as will now be described. If the graphics application supports dynamic content in layers, the dynamic content for the layers used to define hot spots is calculated before the hot spots are calculated.

In selecting a layer to define a hot spot, the user will naturally select a layer that has one or more non-transparent regions in a transparent frame. The non-transparent region or regions in combination define the area of the hot spot. Each non-transparent region is converted to a perimeter boundary path to which the selected shape is fit (step 222). This may be done by tracing the outer boundary of each non-transparent region in the layer.

In one implementation, the pixels in the layer are scanned and a 1-bit deep bitmap is created for each non-transparent region. For each identified non-transparent region, the outer boundary is traced to create a polygon approximating the outer boundary of the region's original pixels. If shape other than a polygon is requested, the polygons are converted to the requested shape. The union of the one or more shapes formed in this way defines the area of the hot spot, which may be non-contiguous and therefore may generate multiple image maps in an HTML implementation.

In one implementation, the regions are found as follows. The pixels in a copy of the layer (which may be a partial copy) are scanned in a regular fashion. When the first non-transparent pixel is found, it is given a recognizable value and is used as a seed pixel in a seed fill algorithm that is applied to find all contiguous non-transparent pixels, each of which is given the same recognizable value. In this way, the application finds a contiguous region in the layer. The bounding box of the region (the minimum rectangle that includes all pixels of the region) is calculated and stored to use in optimizing later processing. The scanning process is then resumed. When a non-transparent pixel is found, the application determines whether it is part of a region that has already been found. If it is not, it is given a different recognizable value and the process of finding the extent of the new region is repeated beginning with this new seed pixel. The process continues until all pixels have been scanned.

In one implementation, any holes within a region are ignored. In an alternative implementation, a region having holes is separated to create separate regions that do not contain holes, and the shapes formed from the separate regions contribute to defining the area of the hot spot, as has been described.

Having information necessary to specify a hot spot—namely one or more formed shapes and a URL (or other action request)—the application converts this information in the target output format, such as HTML (step 224).

The application may also have to convert the composited picture to a target output format, such as GIF (Graphics Interchange Format), JPEG (Joint Photographic Experts Group), or PNG (Portable Network Graphics).

Having both the composited picture (from step 230) and the hot spot information in the target output format (from step 224), the application can write the composited image with the hot spot information as a file, display it on a display device, or print it. In the illustrated implementation, the target output format is HTML.

The invention can be implemented in digital electronic circuitry or in computer hardware, firmware, software, or in combinations of them. Apparatus of the invention can be implemented in a computer program product tangibly embodied in a machine-readable storage device for execution by a computer processor; and method steps of the invention can be performed by a computer processor executing a program to perform functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, specially-designed ASICs (application-specific integrated circuits).

Other implementations are within the scope of the following claims.

What is claimed is:

1. A method comprising:
receiving from a user an input selecting a layer in an electronic artwork having a plurality of layers, each layer including image data, the image data of the selected layer including opacity data;
using the opacity data of the selected layer to identify one or more non-transparent regions;
calculating a perimeter boundary of the one or more non-transparent regions;
using the perimeter boundary to define an area in the selected layer;
assigning an action to the area, the action defining a function that is to be activated when the area is selected; and
associating the area and the action with the selected layer as a property of the selected layer in the electronic artwork.

2. The method of claim 1, wherein:
the action is a URL (Uniform Resource Locator).

3. The method of claim 1, wherein the plurality of layers include compositing controls and the method further comprises:
compositing the plurality of layers of the artwork by combining the plurality of layers to produce a final image; and
converting the area and the action to a target output format.

4. The method of claim 3, wherein:
the target output format is HTML (HyperText Markup Language).

5. In a graphics application that supports dynamic content in layers, the method of claim 3, further comprising:
calculating any dynamic content for the selected layer when the layer is composited; and
using the calculated dynamic content to calculate the perimeter boundary and define the area.

6. The method of claim 3, further comprising:
outputting the final image as an image file; and
outputting an HTML file including an image map for the area and a URL for the action.

7. The method of claim 1, further comprising:
re-defining the area automatically if the content of the selected layer of the electronic artwork is edited, the re-defined area conforming to a new perimeter boundary of the one or more non-transparent regions.

8. The method of claim 1, wherein:
the image data in the selected layer has two or more non-contiguous non-transparent regions; and
the two or more non-contiguous non-transparent regions in combination are used to calculate the perimeter boundary.

9. The method of claim 8, further comprising:
generating multiple image maps from the non-transparent regions.

10. The method of claim 1, wherein:
defining the area further comprises automatically fitting a shape to the perimeter boundary, wherein the shape defines the area.

11. The method of claim 10, farther comprising:
receiving user input selecting the shape.

12. The method of claim 10, wherein the shape is a circle.

13. The method of claim 10, wherein the shape is a rectangle.

14. The method of claim 10, wherein the shape is a polygon.

15. The method of claim 1, wherein the perimeter boundary is for the one or more non-transparent regions in combination.

16. The method of claim 1, wherein there are one or more holes within the one or more non-transparent regions; and
wherein the holes are ignored in calculating the perimeter boundary.

17. The method of claim 1, wherein their are one or more holes within the one or more non-transparent regions; and
each non-transparent region that has a hole is separated into separate non-transparent regions that do not contain holes; and
the perimeter boundary is calculated from the separate hole-free non-transparent regions.

18. A computer program, tangibly stored on a computer-readable medium, comprising instructions fix causing a computer to:
receive an electronic artwork having a plurality of layers, each layer including image data;
receive from a user an input selecting one of the plurality of layers, the image data of the selected layer including opacity data;
use the opacity data to identify one or more non-transparent regions in the image data;
calculate a perimeter boundary of the one or more non-transparent regions;
use the perimeter boundary to define an area in the selected layer; and
assign an action to the area, the action defining a function to be activated when the area is selected.

19. The computer program of claim 18, further comprising instructions to:
automatically fit a shape to the perimeter boundary, wherein the shape defines the area.

20. The computer program of claim 6, further comprising instructions to:
receive user input selecting the shape.

21. The method of claim 20, wherein the shape is a circle.

22. The method of claim 20, wherein the shape is a rectangle.

23. The method of claim 20, wherein the shape is a polygon.

24. The computer program of claim 18, wherein the plurality of layers include compositing controls and the program further comprises instructions to:
composite the artwork by combining the plurality of layers to produce a final image; and
convert the area and the action to a target output format.

25. The computer program of claim 24, wherein the target output format for the area and the action is HTML.

26. The computer program of claim 25, further comprising instructions to:
write out the final image as an image file and write out an HTML file containing an image map for the area and a URL for the action, the HTML file referring to the image file.

27. The computer program of claim 24, further comprising instructions for causing a computer to:
calculate any dynamic content for the selected layer when the layer is composited; and
use the calculated dynamic content to calculate the boundary and define the area.

28. The computer program of claim 18, further comprising instructions for causing a computer to:
   associate the area and the action with the selected layer as a property of the selected layer.

29. The computer program of claim 28, further comprising instructions for causing a computer to:
   re-define the area automatically if the content of the selected layer of the electronic artwork is edited, the re-defined urea conforming to a new perimeter boundary of the one or more non-transparent regions.

30. The computer program of claim 18, wherein:
   the image data in the selected layer has two or more non-contiguous non-transparent regions; and
   the two or more non-contiguous non-transparent regions in combination are used to calculate the perimeter boundary.

31. The computer program of claim 30, further comprising instructions for causing a computer to:
   generate multiple image maps from the non-transparent regions.

32. The computer program of claim 18, wherein the action is a URL (Uniform Resource Locator).

33. The computer program of claim 18, wherein the boundary is for the one or more non-transparent regions in combination.

34. The computer program of claim 18, wherein there are one or more holes within the one or more non-transparent regions; and
   wherein the holes are ignored in calculating the perimeter boundary.

35. The computer program of claim 18, Wherein there are one or more holes within the one or more non-transparent regions; and
   each non-transparent region that has a hole is separated into separate non-transparent regions that do not contain holes; and
   the perimeter boundary is calculated from the separate hole-free non-transparent regions.

* * * * *

UNITED STATES PATENT AND TRADEMARK OFFICE
CERTIFICATE OF CORRECTION

PATENT NO. : 7,139,970 B2 Page 1 of 1
APPLICATION NO. : 09/058496
DATED : November 21, 2006
INVENTOR(S) : Jeffrey H. Michaud and Douglas K. Olson It is certified that error appears in the above-identified patent and that said Letters Patent is hereby corrected as shown below:

Column 5, line 65, delete "farther" and replace with --further--;
Column 6, line 12, delete "their" and replace with --there--;
        line 20, delete "fix" and replace with --for--;
        line 39, delete "6" and replace with --19--;
        lines 42, 43, and 45, delete "method" and replace with --computer program--;
Column 7, line 9, delete "urea" and replace with --area--;
Column 8, line 11, delete "Wherein" and replace with --wherein--.

Signed and Sealed this

Sixth Day of March, 2007

JON W. DUDAS
*Director of the United States Patent and Trademark Office*